A. H. WHATLEY.
TAG TYING MACHINE.
APPLICATION FILED OCT. 26, 1916.

1,225,090.

Patented May 8, 1917.
8 SHEETS—SHEET 1.

Inventor:
Alfred H. Whatley
by his attorney
Charles F. Richardson

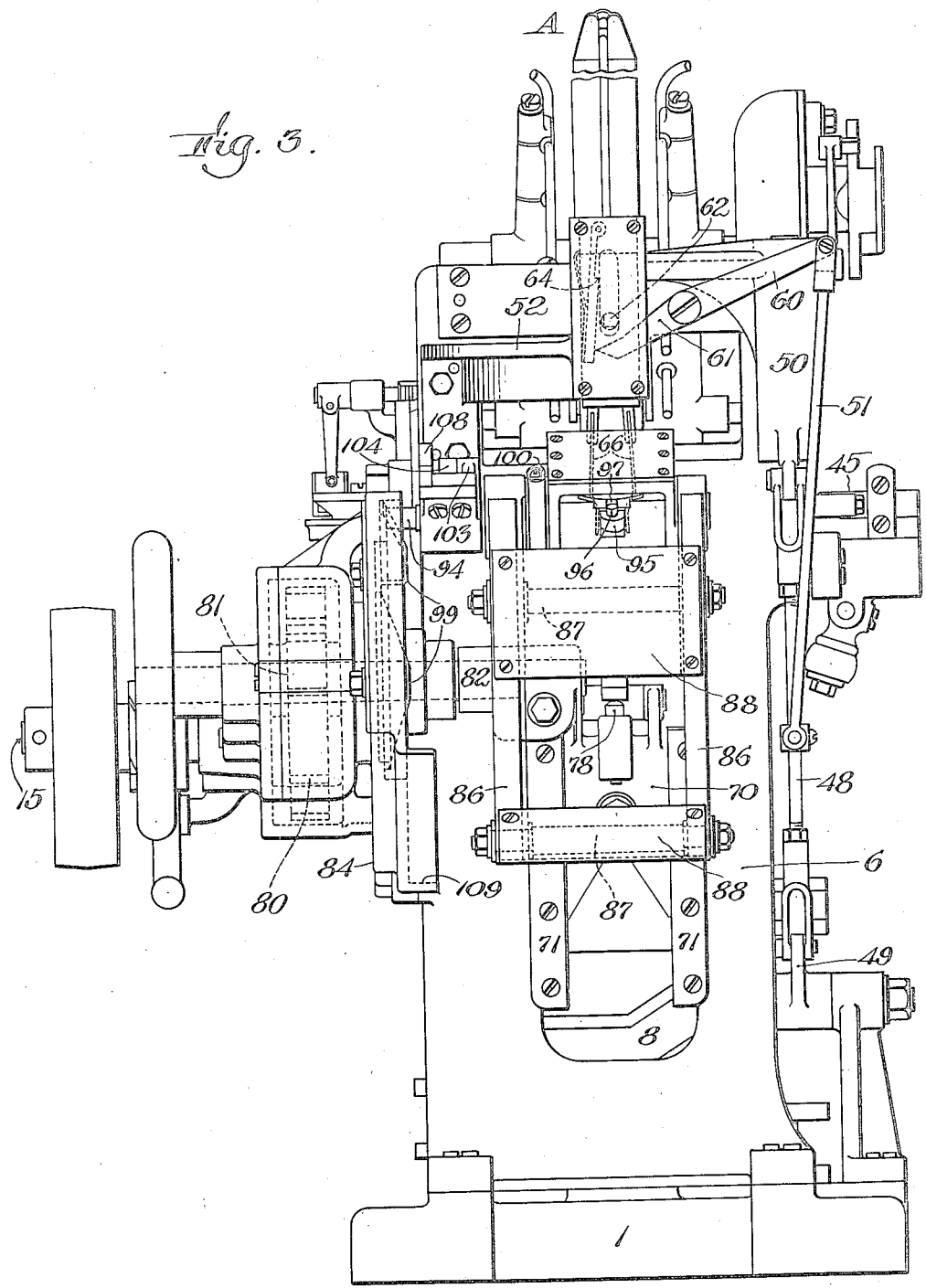

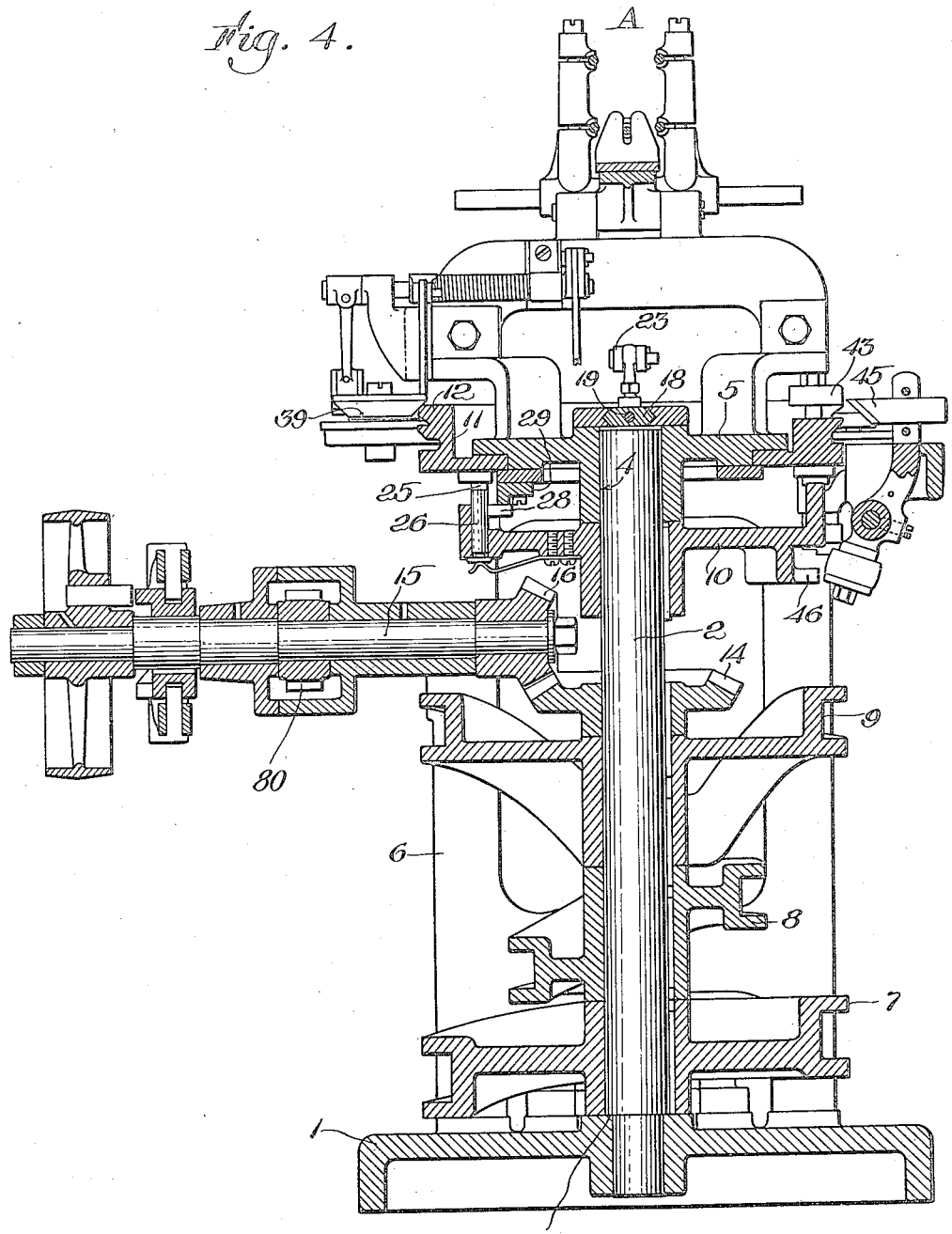

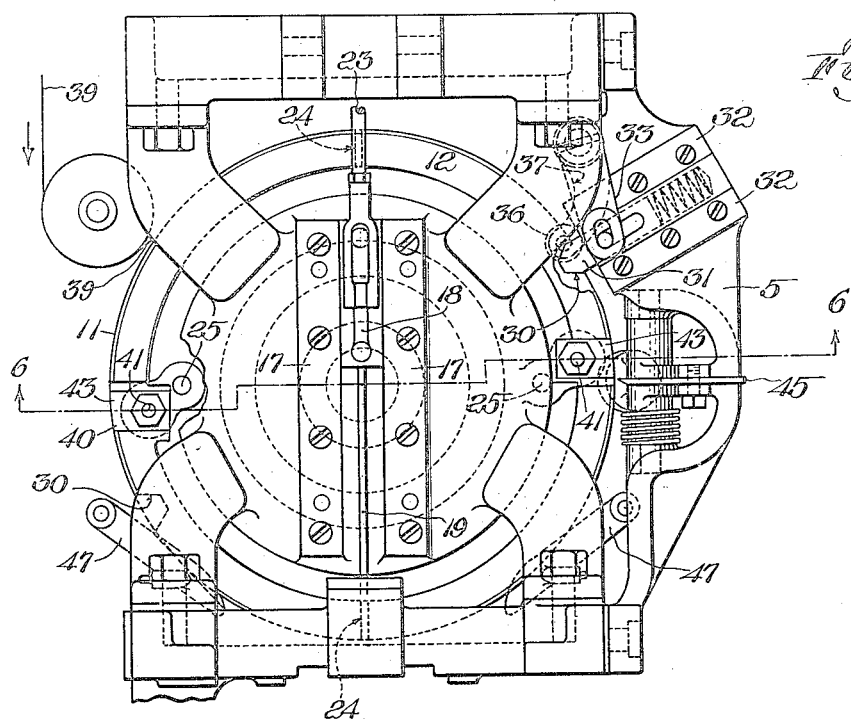

A. H. WHATLEY.
TAG TYING MACHINE.
APPLICATION FILED OCT. 26, 1916.

1,225,090.

Patented May 8, 1917.
8 SHEETS—SHEET 5.

Inventor:
Alfred H. Whatley
by his attorney
Charles F. Richardson

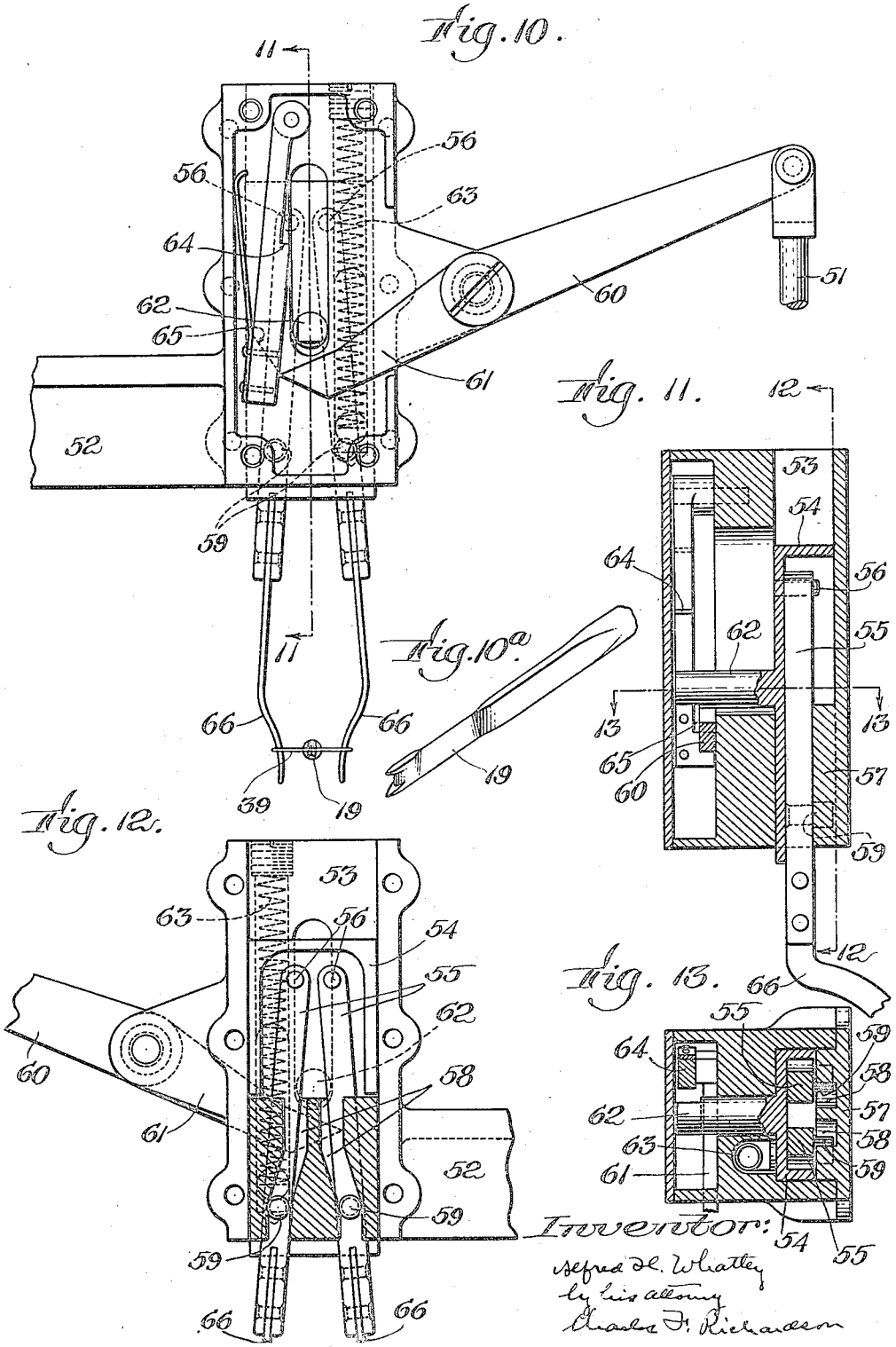

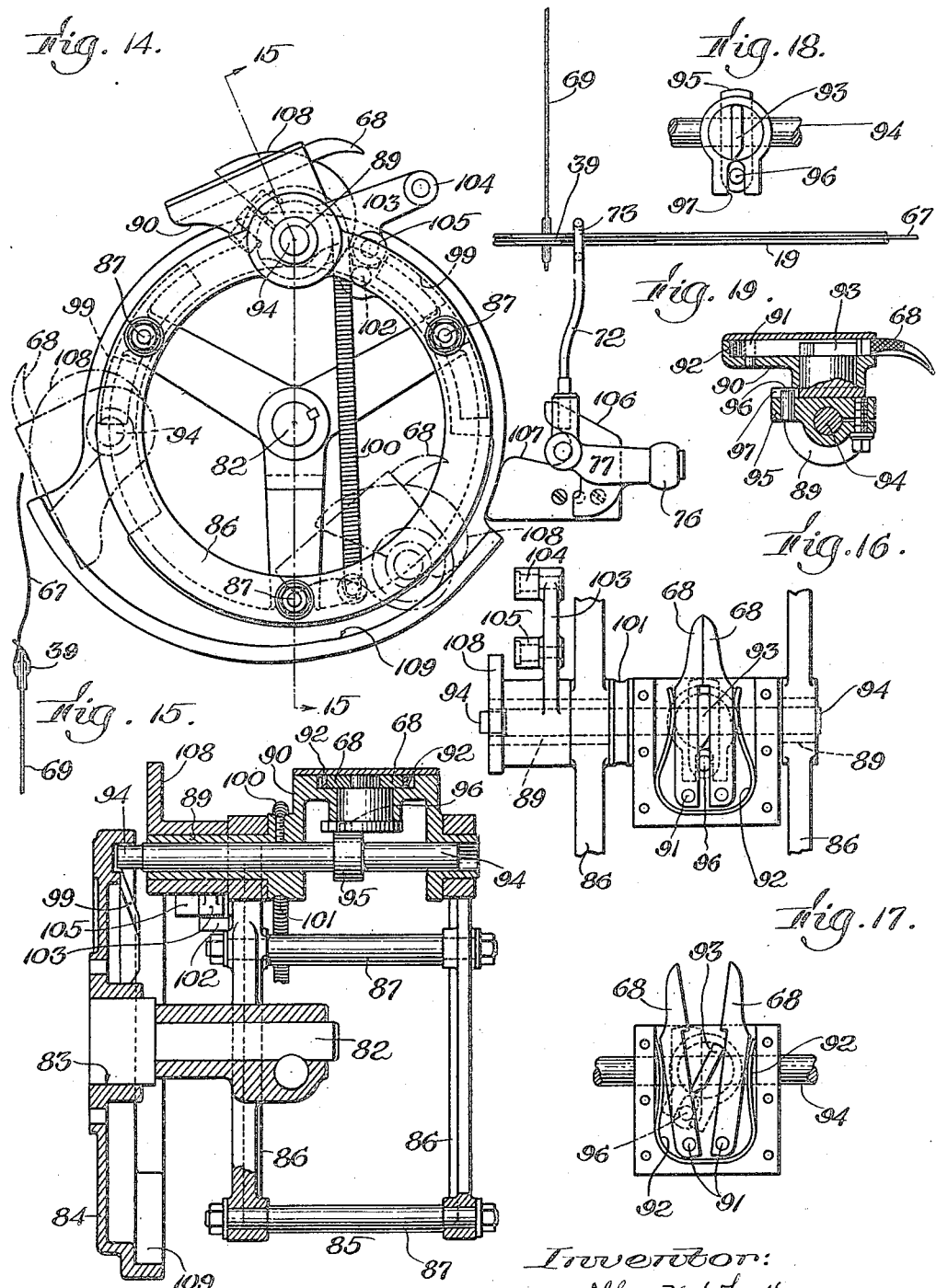

A. H. WHATLEY.
TAG TYING MACHINE.
APPLICATION FILED OCT. 26, 1916.
1,225,090.
Patented May 8, 1917.
8 SHEETS—SHEET 8.
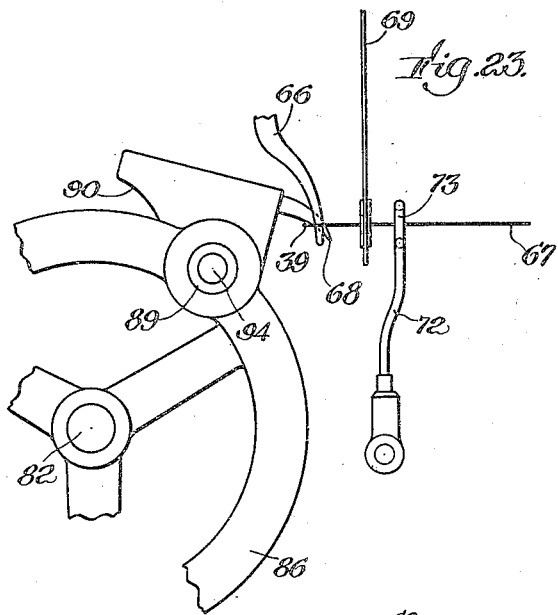
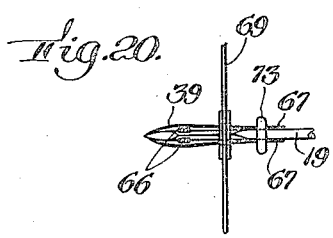
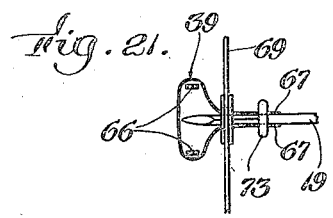
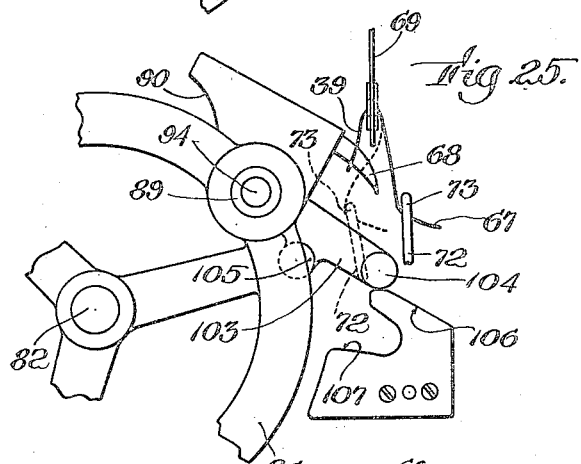
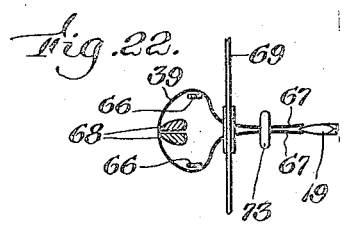
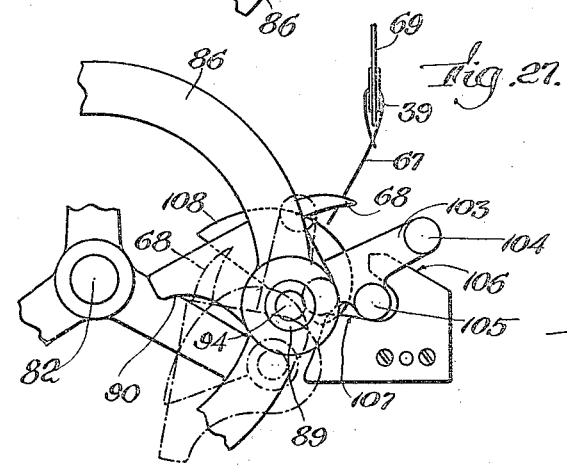
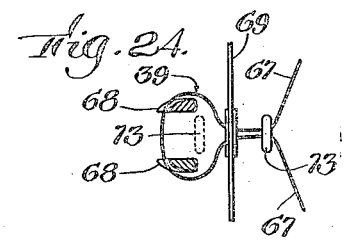
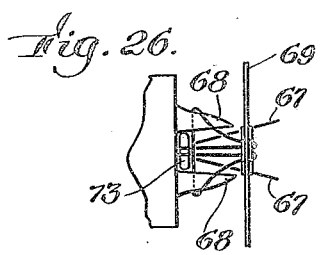
Inventor:
Alfred H. Whatley
by his attorney
Charles F. Richardson

UNITED STATES PATENT OFFICE.

ALFRED H. WHATLEY, OF PROVIDENCE, RHODE ISLAND, ASSIGNOR TO WETHERELL TAG-STRINGING MACHINE COMPANY, OF FALL RIVER, MASSACHUSETTS, A CORPORATION OF MASSACHUSETTS.

TAG-TYING MACHINE.

1,225,090.  Specification of Letters Patent.  Patented May 8, 1917.

Application filed October 26, 1916. Serial No. 127,803.

*To all whom it may concern:*

Be it known that I, ALFRED H. WHATLEY, a citizen of the United States, residing at Providence, in the county of Providence and State of Rhode Island, have invented certain new and useful Improvements in Tag-Tying Machines, of which the following is a specification, reference being had therein to the accompanying drawings.

My invention relates to improvements whereby a tag-tying machine may be operated at increased speed, and with greater certainty and smoothness of action than has heretofore been the case, all of which results in such advantages as increased output, less waste in material used, and in wear and tear of parts of machine, hence increased profits.

The principal improvements may be said to reside in three features and combinations thereof:—First, in means for insuring certainty and speed of action in the string-feeding apparatus. Second, in means to engage, enlarge and hold open a loop of string presented to it by the string-feed apparatus, which latter is enabled to return to normal condition at a slower speed and at an earlier period in the cycle of operations, than would be the case were this feature not used. It also avoids the necessity of a very accurate adjustment of the grippers of the string-gripping apparatus, in relation to the string-feed apparatus, and allows the grippers readily and surely to pass into and out of said loop. Third, in means whereby the grippers of the string-gripping apparatus may in their rotary movements move, substantially uniformly and quietly; and in particular means for opening and closing said grippers. Fourth, in such other novel means as may appear hereinafter.

In the drawings illustrating the principle of my invention and its various features, in the best embodiment now known to me, Figure 1 is a side elevation of my tag-tying machine embodying all of the features of my invention.

Fig. 3 illustrates, in front elevation, the machine that appears in Fig. 1.

Fig. 4 is a vertical section through the power and cam shafts.

Fig. 5 shows in plan, in enlarged detail, the string disk, top of frame, and coöperating devices.

Fig. 6 is a section on line 6—6, Fig. 5.

Fig. 7 is a plan of a string-disk operating plate with cams thereon: a fixed unlocking cam member being indicated in dotted lines.

Fig. 10 is a view like Fig. 8, except that the loop-forming apparatus is in released and extended position.

Figure 1:
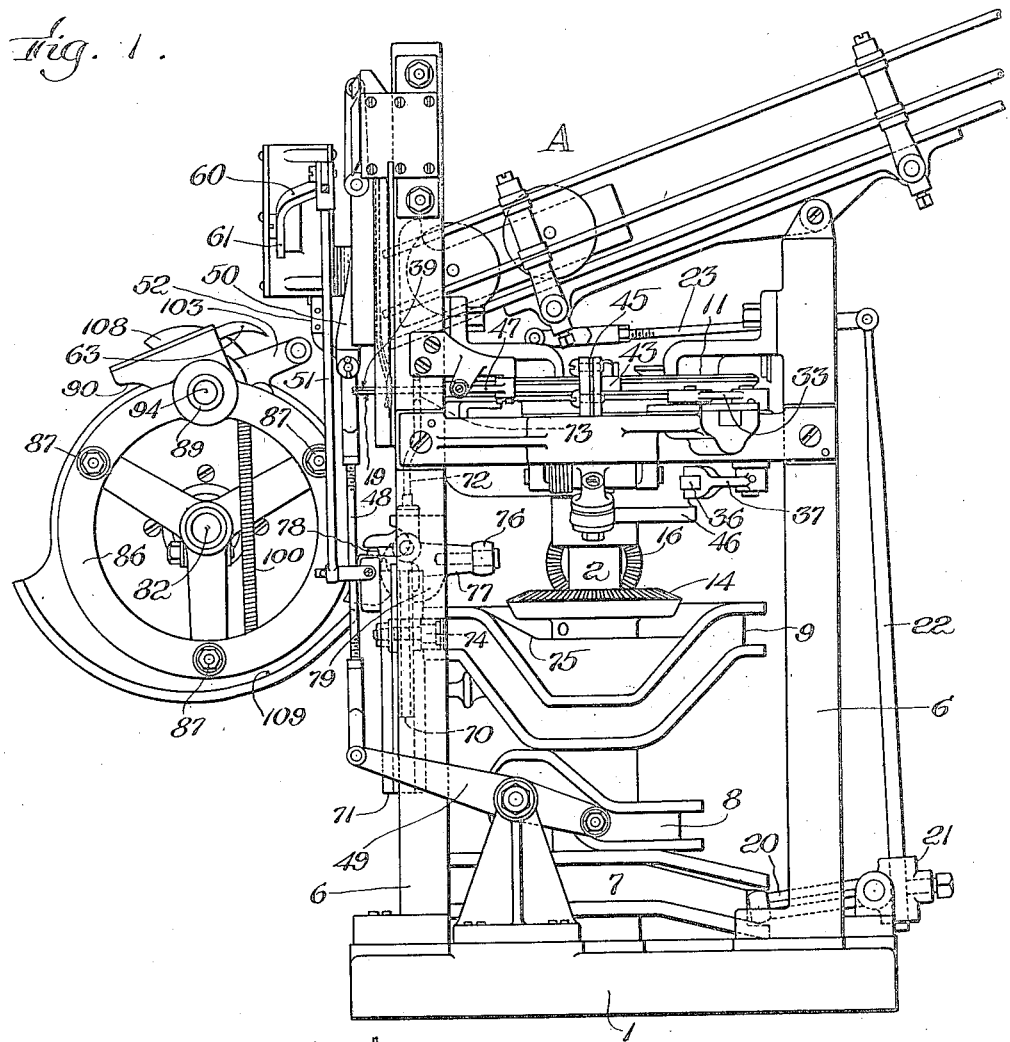

Fig. 10ª is a perspective view of the operative end portion of the loop-forming pushrod.

Fig. 11 is a vertical section on line 11—11, Fig. 10.

Fig. 12 illustrates, in rear elevation, what appears in Fig. 10; and on line 12—12 in Fig. 11.

Fig. 13 is a horizontal section, on line 13—13, Fig. 11.

Fig. 14 shows in elevation, the loop-forming pushrod, within the eye of a tag, and the eye of the string-end delivery device; and the string-gripping apparatus; all in operative relations; various rotary positions of the gripper mechanism being indicated in dotted lines.

Fig. 15 is a section on line 15—15, Fig. 14.

Fig. 16 discloses, in plan, in fragment, the grippers, closed, and operating means.

Fig. 17 shows the grippers opened by said means.

Fig. 18 is a detail view of the means for opening the grippers; while

Fig. 19 makes plain, by a sectional view, the coöperative relations between said means and the grippers.

Fig. 20 illustrates diagrammatically in plan, the relations between the pushrod with string thereon, and the pick-off fingers of the loop-forming apparatus, just after the pushrod has passed through the eye of the string delivery device and that of the tag.

Fig. 21 shows the string held and extended by the pick-off fingers; the pushrod returning to normal position.

Fig. 22 shows the grippers of the string-gripping apparatus entering the loop still further opened by the pick-off fingers; the pushrod having returned still nearer to normal position.

Fig. 23 is an elevation of what appears in Fig. 22.

Fig. 24 shows in full lines, the string supported by the opened grippers, the pick-off fingers having returned to normal position. The dotted line in string-end delivery device showing its next position to deliver the string ends between the grippers.

Fig. 25 is an elevation of what appears in Fig. 24.

Fig. 26 shows the opened grippers in the loop, ready to seize the string ends, and draw them upward and outward through the loop.

Fig. 27 shows in elevation the grippers closed upon the string ends, and after they have rotated rearwardly drawing the ends out through the loop, and tightening the slip noose on the tag. The extreme rearward position assumed by the grippers, as the gripper wheel advances, is indicated in dotted lines.

*String-feeding apparatus of tag-tying mechanism.*

Mounted upon a suitable base 1 is a vertical cam-shaft 2 having an end thrust bearing 3, Fig. 4, and also a bearing 4 in a horizontal circular plate 5 constituting the top of a frame having four supporting legs 6 secured to the base. Fixed to this shaft are a series of wheels having circumferential paths forming, namely, a string-feeding cam 7, a tag-feeding cam 8 and a loop-end delivering cam 9, and a string-disk operating plate 10, Figs. 4, 6 and 7, with a number of cams thereon to be more particularly described hereinafter.

Figure 2:
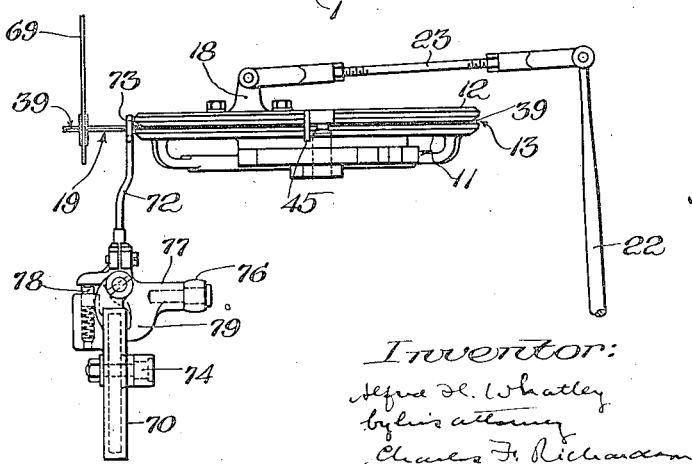
Fig. 2 shows in side elevation, portions of the string-feeding apparatus, and of the string-delivery device, appearing indistinctly in Fig. 1.

Mounted to turn circumferentially in the circular top of the frame, is a rotatable string-disk 11, Figs. 2, 4 and 6, having a raised outer rim 12 with a circumferential groove 13 designed to receive the string eventually to be delivered to a string-looping mechanism. Also fixed to this shaft, is a bevel gear 14, Fig. 1, through which power to drive the machine is derived from a driving shaft 15 and a meshing bevel pinion 16.

Two slide ways 17, Figs. 5 and 6, parallel with the diameter of the table top or plate, are fixed thereto, and have reciprocatingly mounted therein, a slide 18, Fig. 4, for a loop-forming pushrod 19, Figs. 1 and 2, of the string-feeding mechanism. The timely movement of the slide and rod is brought about by the string-feeding cam 7 on the vertical cam shaft, which is in engagement with the short arm 20 of a bell crank lever 21 pivoted to said base; the long arm 22 of the lever being adjustable longitudinally and movably connected with the slide 18 by a link 23 which is likewise adjustable lengthwise. Two horizontal holes 24, Fig. 5, diametrically opposite, and corresponding in position to that of the loop-forming pushrod, pierce the rim 12 of the rotatable string disk, in the plane of its string groove 13, to allow the pushrod 19 to move through the rim and to engage the string in the groove, in a way to be explained hereafter.

In order that the loop or pushrod 19 may move uninterruptedly through these holes, the rotatable string disk 11 is designed to move one-half of a revolution for each revolution of the vertical cam-shaft 2, and then stop when the pushrod and the holes 24 in the disk are in alinement. This is brought about by two depending lugs 25, Figs. 4 and 6, located upon the bottom portion of the string-disk 11, and diametrically opposite, which are alternately engaged by a vertically operated pin 26 mounted in the rotating string-disk operating plate 10; said pin being held by a spring 27 in its extreme top position, ready to engage said lugs on the string disk. A cam-bar 28 extends laterally from the side of this pin, through its bearing, and may be depressed by an unlocking cam-member 29 so fixed and located upon the underside on the top 4 of the frame, that the cam-bar 28 moves down and consequently the lock pin 26 passes the adjacent lug 25 on the rotatable string-disk, when the pushrod holes 24 in the rim are in alinement with the pushrod 19; thus leaving the string disk and rim in the desired position where it is temporarily locked by the following described mechanism. Two diametrically opposite lock slots 30, Fig. 5, are radially cut in the string-disk 11, under the string groove 13; while in the frame, is a spring lock-bolt 31 reciprocatingly movable in guides 32, to engage the slots 30 successively in said radial direction. To accomplish this movement, an arm 33, pivoted to the frame, is controlled in its movements by two lock control cams 34, 35, Fig. 7, formed upon the circumferential edge of the rotating operating disk 10 which successively operate a roller 36 on an arm 37 operatively connected with the pivoted bolt-arm 33; the forward cam 34 to unlock, and the rearward cam 35 to lock, the string-disk 11 and frame 5.

Now, upon the completion of the next half revolution of the cam-shaft 2, Figs. 4, 5 and 6, the string-disk 11 becomes unlocked, and the vertically operated lock pin 26 on the operating disk 10, engages the next opposite lug 25, and moves the string-disk another half revolution; the stationary unlocking cam 29 again operating the cam-bar 28 and disengaging the pin from the adjacent lock lug 25. In short, for one revolution of the cam-shaft 2, the pushrod 19 operates through one hole 24 in the rim 12 of the string-disk; and for the second revolution, the pushrod passes through the second and opposite hole 24 in the disk.

String 39 is delivered to this string rim 12, from a tension device (not shown) having the string wound thereon, the string being delivered in a plane common to that of the string groove 13, Fig. 2, in the rim. The string is there held by one of two diametrically opposite string-jaws 40, Figs. 5 and 6, alternately opened and closed upon a new length of string. Each jaw is made up of a vertical guide pin mounted in a hole therefor in the rim 12 of the string disk 11; each pin being at a point 90° between the said pushrod holes 24, so as to obtain a loop of string with equal ends formed by the pushrod 19. A tension spring 42, mounted upon said pin, always tends to hold a lip 43, upon the top end portion of the pin 41, in engagement with the rim, and hence the string in the groove; but to separate the lip to release the free end of the string, once for each revolution of the string-disk when the latter is in string delivery position for the pushrod, a cam 44, Figs. 6 and 7, for this purpose is provided and properly located upon the string operating disk 10. Diametrically opposite the forward string jaws 40, when the string plate is in locked position, is a knife blade 45, Figs. 4 and 5, pivoted to the frame and operated by a knife operating cam 46, Figs. 1, 6 and 7, fixed to the rotating operating disk 10. 180° of string upon the string disk may thus be simultaneously released and cut and left in position to be delivered by the pushrod to the loop-forming mechanism. To hold this severed string in the groove during the delivery by the pushrod, there are pivoted to the frame two string-presser fingers 47, the outer portions of which lie against the string groove and are there held by two rear springs fast to the frame.

*Loop-forming apparatus of tag-tying mechanism.*

The tag-feeding mechanism, illustrated, constitutes no part of my invention, but is shown because I utilize the seasonable movement of its cam 8, Fig. 1, and vertically reciprocating member 48, for operating the second but principal feature of my invention, viz., means to enlarge and hold open the loop of string presented by the pushrod, and allow said rod to be withdrawn before the grippers of the tag-tying mechanism enter the loop; instead of after, as in prior machines.

The tag-feeding cam 8 on the cam shaft 2, vibrates a lever 49 pivoted to the base, and causes a vertical reciprocation of the adjustable member 48, the outer end of which is pivoted to a head 50 sliding in a vertical guide on the frame. It is from this member 48, that the second feature of my invention is operated.

Directly in front of the tag chute A, Figs. 1 and 3, there is a bracket 52 fast to the frame, and having a vertical guide recess 53, Figs. 11 and 12, rectangular in cross-section, cut in the rear face of it. In this recess, is a pick-off operating plate 54 to which are pivoted two depending pick-off arms 55, having pivots 56 equally distant from a vertical plane passing through the longitudinal axis of the pushrod 19, Fig. 8; a pick-off cam-plate 57 serving as a cover for this recess, has its inside vertical face provided with two similar but oppositely arranged cam-slots 58, Figs. 12 and 13, extending downwardly, parallel, then outwardly and downwardly, and then downwardly. In these cam-slots, cam pins 59 of the pick-off arms, slide.

This operating-plate 54 is raised by the operating lever 60 pivoted upon the head of the bracket; one arm 61 of which engages a lug 62 on the operating plate 54, while the other is connected to the reciprocating link 51, Fig. 1, of the cam-feed mechanism. When the plate 54 has been raised (see Figs. 8 and 10) the desired distance against the resistance of a spring 63 acting on the plate, a pick-off latch 64, pivoted to the head of the bracket in a recess in the front of the head, springs under the lug 62, thus retaining the plate; but, upon the downward movement of the free end 61 of the operating lever 60, the latter engages an unlocking cam 65 on the pick-off latch 64, and the lug being released, the spring snaps downward the operating plate; the lateral movements of the pick-off arms 55 being determined by the pick-off cam-slots 58, Fig. 12. Upon the next upward movement of the operating lever 60, it engages the lug 62, and lifts the plate 54 until the lock latch 64 catches under the lug 62 of the plate, as already pointed out.

Each of these pick-off arms 55 has a thin steel pick-off finger 66. Normally these fingers are close together when the cam pins 59 of the pick-off arms are in the upper parallel portion of the pick-off cam-slots 58. Further, the medial line separating these cam-slots and fingers lies in the vertical plane passing through the longitudinal axis of the push or loop-delivering rod 19, already described.

Figure 8:
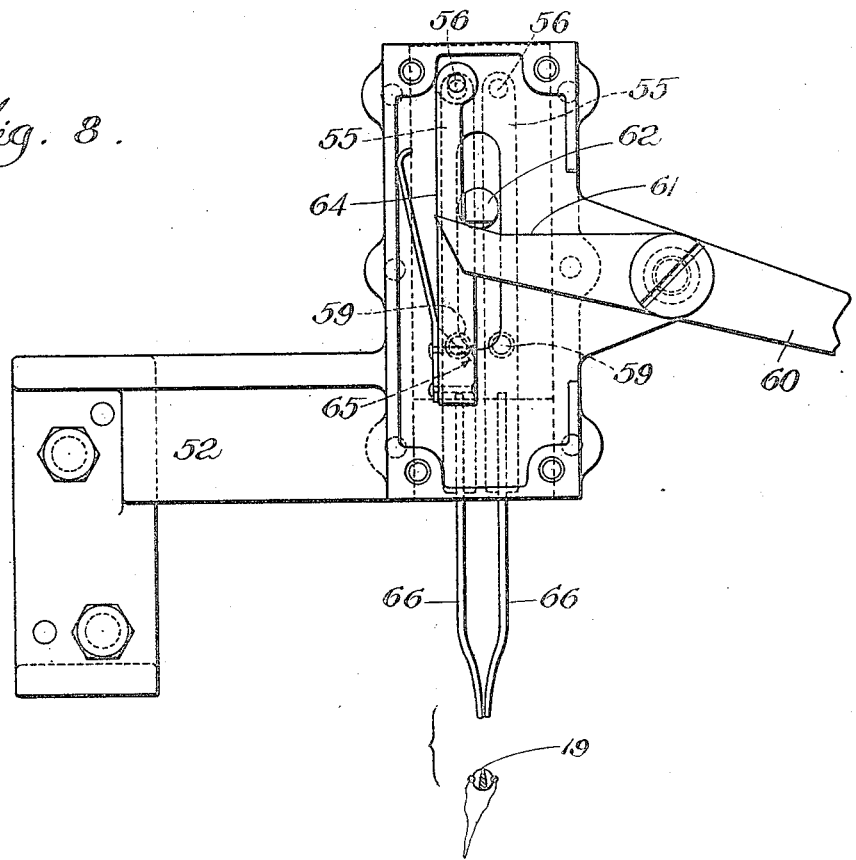
Fig. 8 shows a front elevation of the loop-forming apparatus in closed and raised position, with front plate removed.
Figure 9:
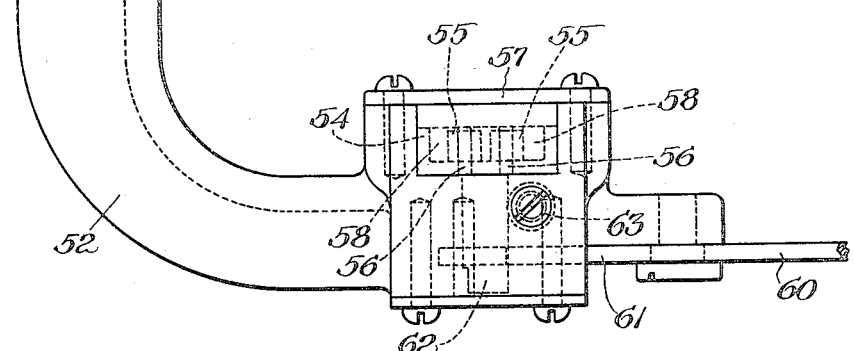
Fig. 9 is a plan of the said apparatus.

It is to be noted that the end of the pushrod 19, Figs. 8 and 10ª, is notched horizontally to insure engagement of the string, and that the free end portion of the pushrod is triangular in cross section, and is so formed that the free end portion of the pick-off fingers 61, Fig. 20, will, while moving downward, pass with certainty between the sides of the pushrod and the sides of the string loop 39, presented by the pushrod.

String-delivery device of tag-tying mechanism.

To deliver the two ends 67, Figs. 14 and 25, of the severed string 39 to the grippers 68, of the string-gripping apparatus, to complete the operation of tying the string to the tag 69, there is a slide 70, Figs. 1 and 2, movable in vertical guideways 71, and having a pivoted string-end delivering member 72, Figs. 2 and 14, the free end of which has a hole 73 that is designed to be in alinement with the reciprocating string pushrod 19 when it is in active position, and through which the loop of string is pushed on its way to the tag 69. The desired movements of these members are brought about by the delivery cam-wheel 9 having first, its circumferential cam groove engaged by a roller 74 mounted on the slide 70; and second, a cam surface 75 to be engaged by a roller 76 on an arm 77 of the string-end delivering member 72, which is held in normal vertical position by a spring member 78 on the slide 70; said member forcing an abutment 79 on the string-end delivering member, into engagement with the slide. The free end of the string-end delivering member is thus given both a reciprocating vertical movement, and a forward and back movement, the purpose of which will become evident from a description of the operation of the machine.

I will now describe that part of the tag-tying machine, particularly the gripper-finger mechanism which embodies the third feature of my invention.

String-gripping apparatus of tag-tying mechanism.

Fixed to the power shaft 15, Fig. 4, is a driving gear 80 forming one of a train (not shown) the last 81 of which is secured to a shaft 82, Figs. 1, 3, and 15, mounted in suitable bearings 83 in a bracket 84, fast to the frame, for the purpose of properly operating the gripper mechanism with the string-feed and the loop-forming apparatus. A rotatable gripper-supporting frame 85 comprising two metal disks 86 bound together by bolts 87 and plates 88 is fixed to the shaft. A hollow gripper-wheel arbor 89, with axis parallel to that of the shaft 82, is free to turn in bearings in the ring portions of the disks 86; while integral with the arbor is a bracket 90 for the reception of a pair of string-grippers 68. Upon a plane face of the bracket at right angles to the vertical plane passing through the longitudinal axis of the pushrod, are the pivoted grippers, their pivotal points 91 equally distant from said latter plane. In fact, the gripping points of the grippers 68, when in normal position, are in said plane; a gripper spring 92 acting on the two outside surfaces, and always tending to hold them in normal position against a gripper-opening cam-member 93, Figs. 16, 17, 18 and 19, rotatably mounted in the bracket, between said grippers, that the grippers may open or close equally upon each side of said vertical plane. A gripper-operating rod 94, Fig. 15, is mounted longitudinally within the gripper-wheel arbor 89, and has fixed to it an arm 95 with a pin 96 which engages a slot 97 in an arm 98 integral with the cam member 93, so that a movement of the rod toward the grippers, due to two gripper-operating cams 99, Figs. 14 and 15, on the frame, causes the pin in the slot slightly to rotate the cam member, and hence the cam so as to open the grippers; while the gripper spring 92 operates against the rod in an opposite direction, to allow the grippers to close when the rod is disengaged by the opening cam. The connections between the gripper-operating cam and the operating rod, thus cause the gripper-operating cam to open, and to close the grippers, as the case may be. A gripper-arbor tension spring 100, Fig. 14, having one end connected to the gripper ring frame 86, and the other to a drum 101 therefor, on the gripper arbor, is always tending to draw the arbor and grippers downward and forward, in relation to the ring frame, against a positioning pin 102, Fig. 14, on the ring 86. To rotate the arbor and hence the grippers in an opposite direction, as required, a gripper turning arm 103, Figs. 14, 15, 25 and 27, is fixed to said arbor 89 upon which are two cam rollers 104 and 105 that respectively engage gripper-turning cams 106 and 107 fast to the frame of the machine; these rollers 104 and 105 engaging these cams and causing the arbor and grippers to rotate in said opposite direction. A return cam 108, Figs. 14 and 15, is mounted on the arbor having a surface to engage a corresponding return cam surface 109 upon the bracket, whereby the action of the gripper-arbor spring is restrained sufficiently to allow the arbor to return to normal position smoothly and quickly.

The operation of the various features of my invention.

We will start with the assumption that the driving pin 26, Fig. 6, on the operating disk 10 has just been depressed by the unlocking cam 29 on the frame, so as to disengage the lug 25 on the underside of the string disk 11, and that the string disk is prevented from completing its second half revolution, by becoming locked to the frame by the disengagement of the cam 35 on the edge of the continuously moving operating plate 10, and the roller 36, Figs. 1 and 5 on the arm 37 controlling the locking bolt 31 which, by reason of a spring (not shown) is snapped into the lock slot 30 in the string disk. The forward end of the string 39, Figs. 5 and 6, is held in the groove 13 of the string disk by the closed spring-operated jaws 40; while the rear portion of the string in the groove lies between the opposite pair of jaws 40 being held open by the sliding engagement of the jaw-controlled cam 44 on the revolving operating plate 10. But almost instantly thereafter, these latter jaws are released by the control cam 44, and they seize the string between them; and the advancing cam 46 causes the knife blade, through its roller arm, to sever the string at a point just ahead of the closed jaws; the severed portions of the string being held in the string groove 13 of the string disk by the presser fingers 47, Fig. 5. At the next instant, the opposite pair of jaws 40, (see Figs. 6 and 7) are opened by the advancing jaw controlling cam 44 of the operating disk, and the cut string is freely held in the groove of the string disk, ready to be delivered to the tag-tying mechanism; it being remembered that the closed jaws hold the free end of the string in the groove, and carry another length of string into position for severance. During the period of rest of the string disk 11, the reciprocation of the pushrod 19, Figs. 1, 2 and 5, delivers the severed string to the tag-tying mechanism which is completed as follows:—
The vertical cam-shaft 2, Fig. 1, has now
brought the string-feeding cam 7 into position to cause, through the bell crank lever 21 and link 23, the pushrod 19, Fig. 2, to move through the hole 24 therefor in the rim 12 of the now stationary string disk;
through the eye 73 of the loop-end delivering rod 72 held in position by its cam wheel 9 on the driving shaft; and through the eye 69 of the tag which has been delivered into position by the tag feeding mechanism controlled by its cam 8, also on the driving shaft. The pushrod 19, in its forward reciprocation, catches with its horizontally slotted end, the middle of the severed string, forces it through the loop-end delivering rod and the eye of the tag, and exposes and presents the end of the rod and the loop to the action of the pick-off fingers. The tag-feeding mechanism having fed the tag, returns to normal position by the operation of its cam wheel 8, but in so doing, the free end 61 of the lever 60, Fig. 10, operating the loop-forming mechanism, descends, engages the cam surface 65 of the pick-off latch 64, and thereby unlocks the lug 62 on the spring operated finger plate 54. The latter under the pressure of spring 63, descends carrying the pick-off arms 55, which, by reason of their pins 59, Fig. 12, and the cam slots 58 in the plate 57, pass the pick-off fingers 66 down through the loop of string 39, Figs. 10 and 20, sustained by the pushrod 19, and separate them so that they successively enlarge and hold the loop as is clearly shown in Figs. 20, 21 and 22; the push-rod being freed is at once withdrawn through the eye of the tag 69 the eye 73 of the loop-end lever 72, and the hole 24 in the rim of the string disk, by the opposite reciprocation of the pushrod, due to its cam wheel 7, on the vertical shaft, and cooperating bell crank lever 21 and link 23, Figs. 1 and 2.
But after this has happened, the closed grippers 68, as in Figs. 22 and 23, of the tag-tying mechanism dip their points down into the loop 39 on the pick-off fingers 66. As they do so, they begin to open, (see Fig. 24), the opening cam 93, Figs. 16 and 17, between them being operated by the operating rod 94, the end of which rubs along the opening cam 99, Fig. 15, on the frame. While this is taking place, the loop-end device 72 with the ends of the loop through its eye 73, descends and also moves forward as appears in dotted lines in Figs. 24 and 25; the cam wheel 9, Fig. 1, on the driving shaft operating the slide 70 downwardly, while the cam 75, also on the wheel, engages the roll 76 on the arm 17 of the loop-end device, moving it forward about its pivot in the slide, and against the spring pin 78, Fig. 2, in the slide, so as to bring the ends 67, Figs. 25 and 26, of the loop 39 between the grippers 68. Now gripper opening rod 94, Fig. 15, slides off its cam 99, and the gripper spring 92, Fig. 17, closes the grippers on the string ends, and returns and holds the rod in normal position. To withdraw the grippers and draw the ends of the string through the loop, the rollers 104, 105, Figs. 25 and 27, on the turning arm 103, roll successively on their respective cams 106, 107 on the frame, and draw the grippers, closed on the ends of the string, through the loop; while the continued forward rotary movement of the wheel 86, and of the closed grippers, due to the tension spring 100, Fig. 14, pulls the threaded tag 69 from its threading position in the tag-feeding frame. But this tension spring 100 is prevented from snapping the grippers forward by the engagement of the restoring cams 108, 109, Fig. 14, which allow the gripper arbor, and hence the grippers, to move comparatively slowly and uniformly to normal position, where the bracket 90 abuts the positioning pin 102 in the wheel ring 86. While the closed grippers are thus being restored to normal position they are opened to drop the threaded tag 69 as indicated in Fig. 15, by a second releasing cam 99, on the frame, which momentarily moves the release rod 94, and hence the gripper cam 93, in the manner already explained.
It is to be remembered that the gripper mechanism rotates once for each revolution of the vertical power cam-shaft; also that while the string disk is stationary and after the pushrod of the string-feed mechanism has returned to normal position for a new length of string, the operating disk has not quite finished its last half revolution disconnected from the string disk, but upon the completion of said half revolution, the spring pin 26, Fig. 6, in the operating disk, engages the second and opposite lug 25, on the underside of the string disk; the locking bolt 31, locking the disk to the frame, has been unlocked by its cam 34, Fig. 7, on said operating disk; and the string disk begins to complete its last half revolution of its cycle of operations; the string jaws 40 still being held open by their opening cam 44 while the diametrically opposite string jaws are closed on the free end of the string which, for the half revolution of the string disk, is being wound in the string channel thereof. When the string disk has completed said half revolution, it again becomes locked to the frame, and a continuation of the rotation of the operating disk, again results in the cutting of the string, a release of the forward end of the said string, a delivery of the loop by the pushrod, an enlargement of the loop by the pick-off arms, and the threading of another tag by the string gripping apparatus, in the manner already pointed out.

Desiring to protect all of the features of my invention in the broadest manner legally possible,

What I claim is:

1. In a machine having a reciprocating pushrod for forming and delivering a loop of string at a predetermined point:—a reciprocating member; a pair of pick-off fingers pivotally mounted on said member; the free end portions of said fingers being designed to straddle said pushrod and move between said loop and said pushrod, into said loop to open wider and hold open said loop and permit the withdrawal of said pushrod to later form another loop of string; fixed cam surfaces engaged by said pick-off fingers to give the desired lateral movements to the fingers to enlarge and hold open the string loop; and means to return the reciprocating member and pick-off fingers to normal position.

2. In a tag-tying machine having a reciprocating pushrod for forming and delivering a loop of string at a predetermined point, and grippers to move forward and back through said loop:—a reciprocating member; a pair of pick-off fingers pivotally mounted on said member; the free end portions of said fingers being designed to straddle said pushrod and move between said loop and said pushrod, into said loop to open wider and hold open said loop and permit the withdrawal of said pushrod to later form another loop of string; fixed cam surfaces engaged by said pick-off fingers to give the desired lateral movements to the fingers to enlarge and hold open the string loop; and means to return the reciprocating member and pick-off fingers to normal position, after the forward movement of said grippers through said loop supported by said fingers.

3. In a tag-tying machine a reciprocating pushrod for forming and delivering a loop of string at a predetermined point; grippers to move forward and back through said loop; a standard fixed to the frame of the machine; a member reciprocatingly mounted therein; a lock member pivoted to said standard; a spring always tending to move said reciprocating member in one direction; an oscillating lever, one arm of which moves said member in the opposite direction; a spring always tending to move and hold said lock member in locking position; a lug on said reciprocating member, engaged by said lock member, at the end of one movement due to the oscillating lever; a cam surface on said lock member, engaged by the oscillating lever in its opposite movement to release the lock member from the lug on the spring operated plate and permit the spring to cause the plate to move with great speed for the desired distance; a pair of pick-off fingers pivoted to said reciprocating member, their free end portions being thin and normally close together and adapted to engage the loop on said pushrod; cam surfaces on said standard, engaged by said fingers and designed to cause said fingers to spread, enlarge and hold open the loop formed by the pushrod until said grippers have passed through the loop, when the reciprocating plate with said pickoff fingers closed is returned to normal position by said oscillating lever.

4. In a tag-tying machine having a rotary member with string grippers rotatably mounted in said member, to rotate in the plane of movement of said rotary member, said rotation in one direction being brought about by a spring, and in the opposite direction, by a series of turning cams:—a cam surface on the frame of the machine to engage a surface operatively connected with said grippers, to control the action of said spring so that said grippers will return in said plane to normal position substantially uniformly and quietly.

5. In a tag-tying machine having a rotary member; string grippers mounted on an arbor rotatable in said member; an arm fixed to said arbor and having two cam rolls; two cam turning surfaces fixed to the frame of the machine for their respective cam rolls to successively engage to rotate the arbor in one direction; and a spring to tend to rotate the arbor in the opposite direction, and a cam surface on the frame of the machine to engage a surface operatively connected with said arbor, to control the action of said spring so that the said grippers will rotatably return to normal position substantially uniformly and quietly.

6. In a tag-tying machine having a rotary member, string grippers rotatably mounted on a bracket fixed to an arbor rotatable in said member:—a cam bar rotatable between said grippers to open the same; a spring to close the same; a rod longitudinally mounted within the arbor and having a pin in slotted connection with said cam bar; and a cam on the frame to longitudinally move the bar in opposition to the spring.

7. In a tag-tying machine a rotary cam operating disk; a rotatable string disk having two diametrically opposite holes in the plane of its circumferential string channel; means whereby the operating disk will cause said string disk to move with it for one-half of each of its revolutions; a reciprocating push or loop-forming rod; a bolt slidable in the frame of the machine to engage successively two diametrically opposite lock slots cut in the string disk, said slots being so located to be engaged by said bolt when said holes in the disk are in alinement to the pushrod; and a cam on said cam plate to control the locking and unlocking of said disk and said frame, upon each half revolution of the string disk.

In testimony whereof I hereunto affix my signature in the presence of two witnesses.

ALFRED H. WHATLEY.

Witnesses:
CHARLES F. RICHARDSON,
J. HENRY A. GRIFFIN.